No. 725,915. PATENTED APR. 21, 1903.
H. S. BADGER.
COMBINED MEASURING AND SAMPLING MACHINE.
APPLICATION FILED JAN. 19, 1903.
NO MODEL. 2 SHEETS—SHEET 1.

Witnesses.
A. M. Pinkham.
R. W. Byers

Inventor
Harry S. Badger
per
Geo. J. Mosher
Attorney.

No. 725,915. PATENTED APR. 21, 1903.
H. S. BADGER.
COMBINED MEASURING AND SAMPLING MACHINE.
APPLICATION FILED JAN. 19, 1903.
NO MODEL. 2 SHEETS—SHEET 2.

Witnesses.
A. M. Pinkham.
R. W. Byers

Inventor.
Harry S. Badger
per Geo. J. Mosher
Attorney.

United States Patent Office.

HARRY S. BADGER, OF TRURO, CANADA.

COMBINED MEASURING AND SAMPLING MACHINE.

SPECIFICATION forming part of Letters Patent No. 725,915, dated April 21, 1903.

Application filed January 19, 1903. Serial No. 139,571. (No model.)

*To all whom it may concern:*

Be it known that I, HARRY S. BADGER, a citizen of the United States of America, residing at Truro, in the county of Colchester, in the Province of Nova Scotia and Dominion of Canada, have invented a new and useful Combined Measuring and Sampling Machine, of which the following is a specification.

My invention relates to measuring or weighing machines which automatically dump their contents from each end alternately, each alternate movement being recorded on a self-registering device attached to the stand of the machine; and the object of my invention is to combine a sampling device with such a machine in order to obtain a sample at each movement of the machine of the material passing through it. I attain this object by the mechanism illustrated in the accompanying drawings, in which—

Figure 1:
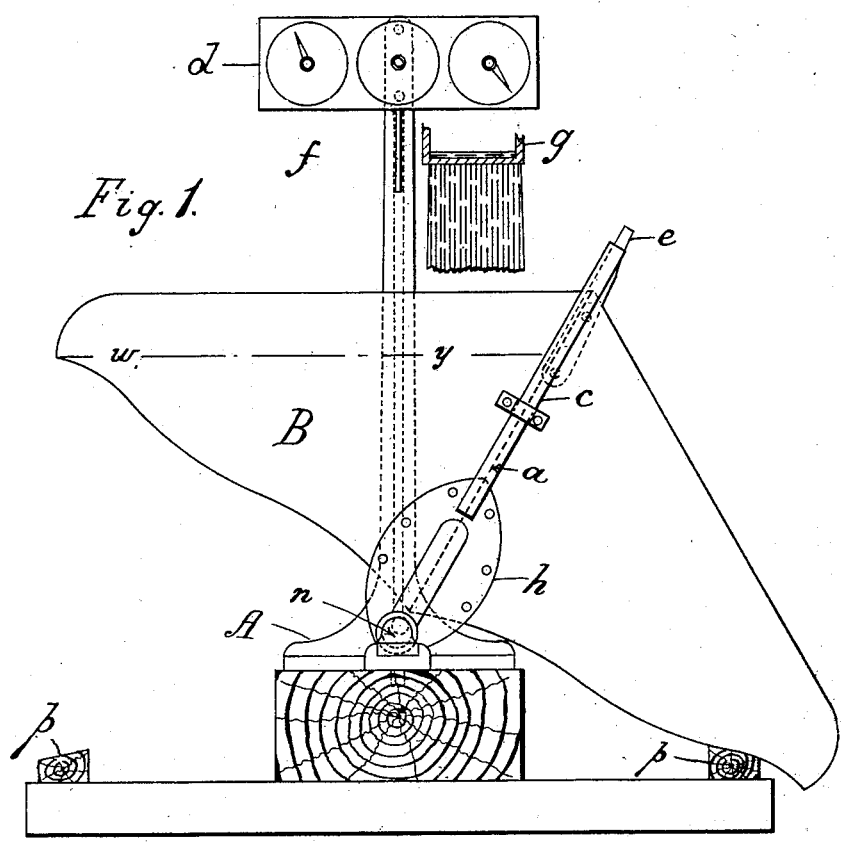
Figure 2:
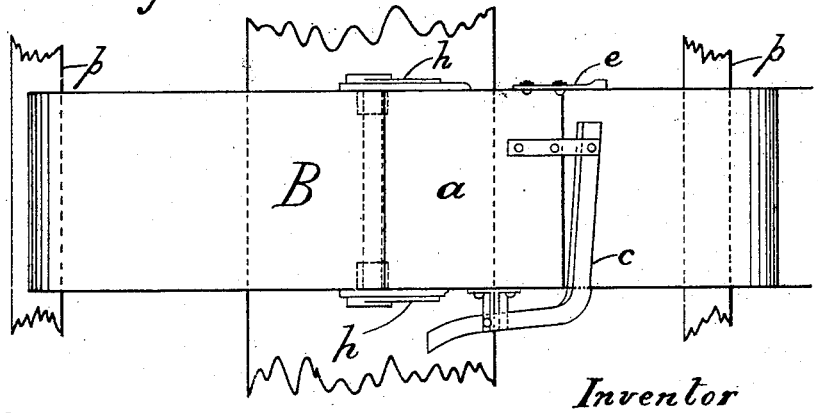
Figure 3:
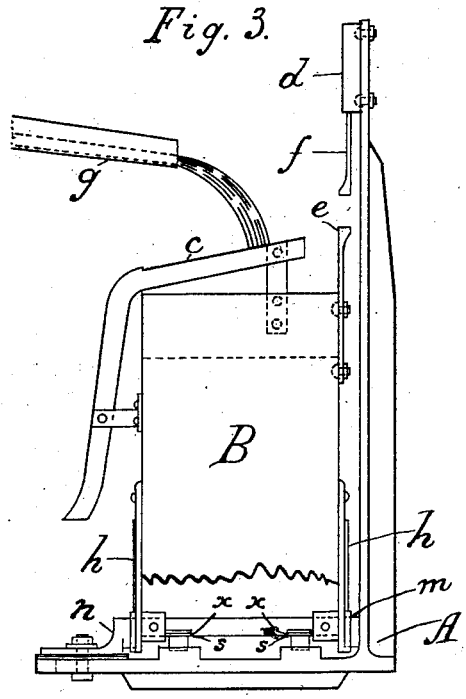
Figure 7:
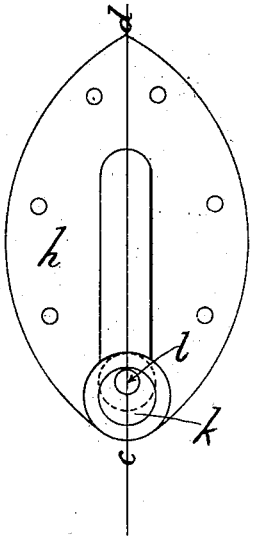
Figure 8:
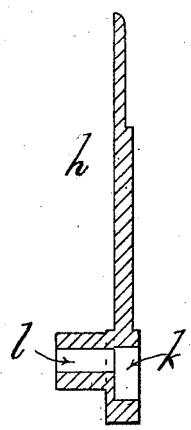
Figure 9:
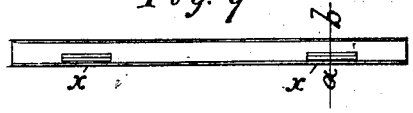
Figure 10:
Figure 4:
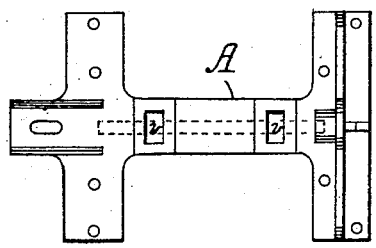
Figure 11:
Figure 12:
Figure 13:
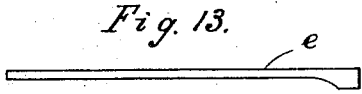
Figure 14:
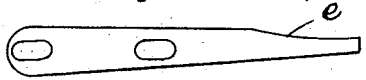
Figure 5:
Figure 6:
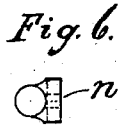

Figure 1 is a side elevation of the machine, showing the sampling-spout, one of the tank-compartments empty and the other one filled ready to dump, also a portion of the launder. Fig. 2 is a plan of the tank and its attachments without the frame or other accessories. Fig. 3 is an end elevation of the machine with the tank partially broken away, showing the method of connecting it with the frame and also showing a portion of the launder. Fig. 4 is a plan of the frame separate from the other parts of the machine. Fig. 5 is a plan of the movable guide. Fig. 6 is an end elevation of the same. Fig. 7 is a side elevation of the bearing-stand. Fig. 8 is a section of the same on line $c\ d$. Fig. 9 is the journal. Fig. 10 is a section of the same on line $a\ b$. Fig. 11 is a plan of the steel support on which the journal rests. Fig. 12 is an end view of the same. Fig. 13 is an edge view of the striker. Fig. 14 is a side view of the same.

Similar letters refer to similar parts throughout the several views.

In the drawings, A is the frame of the machine, which is of cast metal.

B is the tank, which is made of sheet metal and is divided into two compartments of equal capacity by the division-plate $a$.

$c$ is the sampling-spout, which of sheet metal and is attached to the tank and moves with it. It is open on the top, where it projects over the tank and catches a sample of the material being discharged into the tank at each movement of said tank and conveys it to a bucket or any receptacle placed to receive it.

$d$ is the recording instument, which is attached to the top of the frame and is operated by the striker $e$, which is attached to one side of the tank, coming in contact with the lever $f$ at each movement of the tank.

$g$ is the launder, which conveys the material to the tank.

$h\ h$ are the bearing-stands, which are riveted to the tank and which receive the journal and guides.

$k$ is the recess for the guides.

$l$ is the bore to receive the journal.

$m$ is the stationary guide, which is an integral part of the frame.

$n$ is the movable guide, which is adjustably attached to the frame.

$o$ is the journal, which has two pivot-lines $x\ x$, on which the tank, with its attachments, is pivoted.

The indentions $s$ in Figs. 11 and 12 are for the reception of the pivot-lines $x\ x$ of the journal.

$v\ v$ are recesses for the reception of the supports shown in Figs. 11 and 12.

The guides $m$ and $n$ are set concentric to the pivot-lines $x\ x$ of the journal $o$ and are for the purpose of preventing the pivots from becoming displaced.

$p\ p$ are stops on which the empty compartment of the tank rests while the opposite one is being filled.

The operation of the machine is as follows: The material (a gold solution, for instance) is delivered into one compartment of the tank by the launder $g$, and when the solution reaches the water-level line $w\ y$ its weight will overbalance the empty compartment and the contents will be emptied and the opposite compartment will be brought into the proper position to receive the solution, and so on, each compartment being filled and emptied alternately, and the sampling-spout being attached to the tank will secure a sample of the solution at each movement as it passes through the falling liquid and deposit it into any convenient receptacle placed under the spout to receive it; also, the striker $e$ at each movement of the tank will come into contact with the lever $f$ of the recording instrument, thus automatically registering each or each alternate movement, and the contents of the tank having been previously ascertained the recording instrument will show the results at any time.

Having described and illustrated my invention, what I claim, and desire to secure by Letters Patent, is—

1. A tilting tank divided into two compartments and adapted to the measurement of liquids or other material, a registering device, and a frame supporting said tank and registering device, in combination with a sampling-spout attached to said tank and adapted to take a sample of the material passing into said tank at each movement of the same; substantially as described.

2. In a measuring and sampling machine the combination of a tilting tank adapted to the measurement of liquids or other material, means for conveying material to said tank a registering device, a frame supporting said tank and registering device, bearing-stands secured to said tank, a journal having pivot-lines on its circumference on which said tank is pivoted, guides recessed into said bearing-stands concentric to said pivot-lines, and supports adapted to seat and secure said pivot-lines, with a sampling-spout attached to said tank and movable therewith; substantially as described, and for the purpose specified.

In testimony whereof I have signed my name to this specification in the presence of two subscribing witnesses.

HARRY S. BADGER.

Witnesses:
   T. M. GARAZA,
   V. J. PATON.